(12) United States Patent
Sebastian

(10) Patent No.: US 12,445,824 B2
(45) Date of Patent: Oct. 14, 2025

(54) SYSTEM AND METHOD FOR ECOSYSTEM ENCAPSULATOR WITH EMERGENCY RESPONSE ON THE BLOCKCHAIN

(71) Applicant: US Technology International Private Limited, Kerala (IN)

(72) Inventor: Jaison Joseph Sebastian, Trivandrum (IN)

(73) Assignee: US Technology International Private Limited, Kerala (IN)

( * ) Notice: Subject to any disclaimer, the term of this patent is extended or adjusted under 35 U.S.C. 154(b) by 336 days.

(21) Appl. No.: 18/073,279

(22) Filed: Dec. 1, 2022

(65) Prior Publication Data

US 2024/0107285 A1 Mar. 28, 2024

(30) Foreign Application Priority Data

Sep. 22, 2022 (IN) .............................. 202241054417

(51) Int. Cl.
*H04W 4/30* (2018.01)
*G06T 11/00* (2006.01)
*H04W 4/90* (2018.01)

(52) U.S. Cl.
CPC .............. *H04W 4/90* (2018.02); *G06T 11/00* (2013.01); *H04W 4/30* (2018.02); *G06T 2200/24* (2013.01)

(58) Field of Classification Search
CPC ....... H04L 9/50; H04L 9/3239; H04L 9/3247; H04L 67/12; G06Q 2220/00; H04W 4/90
See application file for complete search history.

(56) References Cited

U.S. PATENT DOCUMENTS

| | | | |
|---|---|---|---|
| 2017/0094488 A1* | 3/2017 | Grice | H04W 4/90 |
| 2018/0060596 A1* | 3/2018 | Hamel | H04L 9/088 |
| 2019/0171780 A1* | 6/2019 | Santarone | G02B 27/0093 |
| 2020/0034501 A1* | 1/2020 | Duff | G06T 19/006 |
| 2020/0065433 A1* | 2/2020 | Duff | G01S 5/02 |

* cited by examiner

*Primary Examiner* — Khalid W Shaheed
(74) *Attorney, Agent, or Firm* — NIXON PEABODY LLP; Jeffrey L. Costellia

(57) ABSTRACT

The present subject matter refers to a method and system for method and system implemented with emergency response layers for generating an emergency response in an encapsulator device in a private blockchain network. The method comprising receiving, based on a user input, a non-textual input, then detecting that the user is in an emergency event based on the received non-textual input. The method further includes triggering, at least one emergency response layer that is preconfigured for the emergency event, in response to the detection that the user is in the emergency event and then sending an emergency response to an authorized entity device for taking appropriate action for the emergency event in response to the triggered at least one emergency response layer.

13 Claims, 7 Drawing Sheets

Ecosystem Builder on smart phone

SYSTEM AND METHOD FOR ECOSYSTEM ENCAPSULATOR WITH EMERGENCY RESPONSE ON THE BLOCKCHAIN

FIELD OF THE INVENTION

The present disclosure relates to a method and system for ecosystem encapsulator with emergency response on the blockchain. In particular, the present invention particularly relates to method and system implemented with emergency response layers for generating an emergency response in an encapsulator device in a private blockchain network.

BACKGROUND

As the dimension of speed and automation is infused into every aspect of human life, user's are increasingly served by multiple companies to provide an ecosystems that provide multiple services. The multiple services involve transaction of various data and records. Such data and records need to be an immutable record for the services.

Further, there is an increase in providing applications by the multiple companies for providing services especially in an emergency situation. Now, during an emergency there are scenarios where people are incapacitated due to a physical or mental situation, or due to restraint by someone else. Secondly there is always a risk of tampering of evidence by the criminals and/or authorities. Thirdly there is the risk of too little time but lot to communicate (and differently) to various organizations/people. The entities could be personnel (family, friends) organizations (police, hospital, judiciary, employer), CCTV cameras, IoT devices. Thus, the transactional records must be communicated or retrieved in a secured way without tampering the data. Examples of emergency scenarios include but not limited to medical emergency, malfunctioning of an autonomous vehicle, accidents, attacks by criminals, domestic violence and the like.

Thus, there arise a need to provide a methodology to overcome above mentioned issues.

SUMMARY

This summary is provided to introduce a selection of concepts in a simplified format that are further described in the detailed description of the invention. This summary is not intended to identify key or essential inventive concepts of the invention, nor is it intended for determining the scope of the invention.

In an implementation, the present subject matter refers to a method and system for method and system implemented with emergency response layers for generating an emergency response in an encapsulator device in a private blockchain network. The method comprising receiving, based on a user input, a non-textual input, then detecting that the user is in an emergency event based on the received non-textual input. The method further includes triggering, at least one emergency response layer that is preconfigured for the emergency event, in response to the detection that the user is in the emergency event and then sending an emergency response to an authorized entity device for taking appropriate action for the emergency event in response to the triggered at least one emergency response layer.

To further clarify the advantages and features of the present invention, a more particular description of the invention will be rendered by reference to specific embodiments thereof, which is illustrated in the appended drawing. It is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
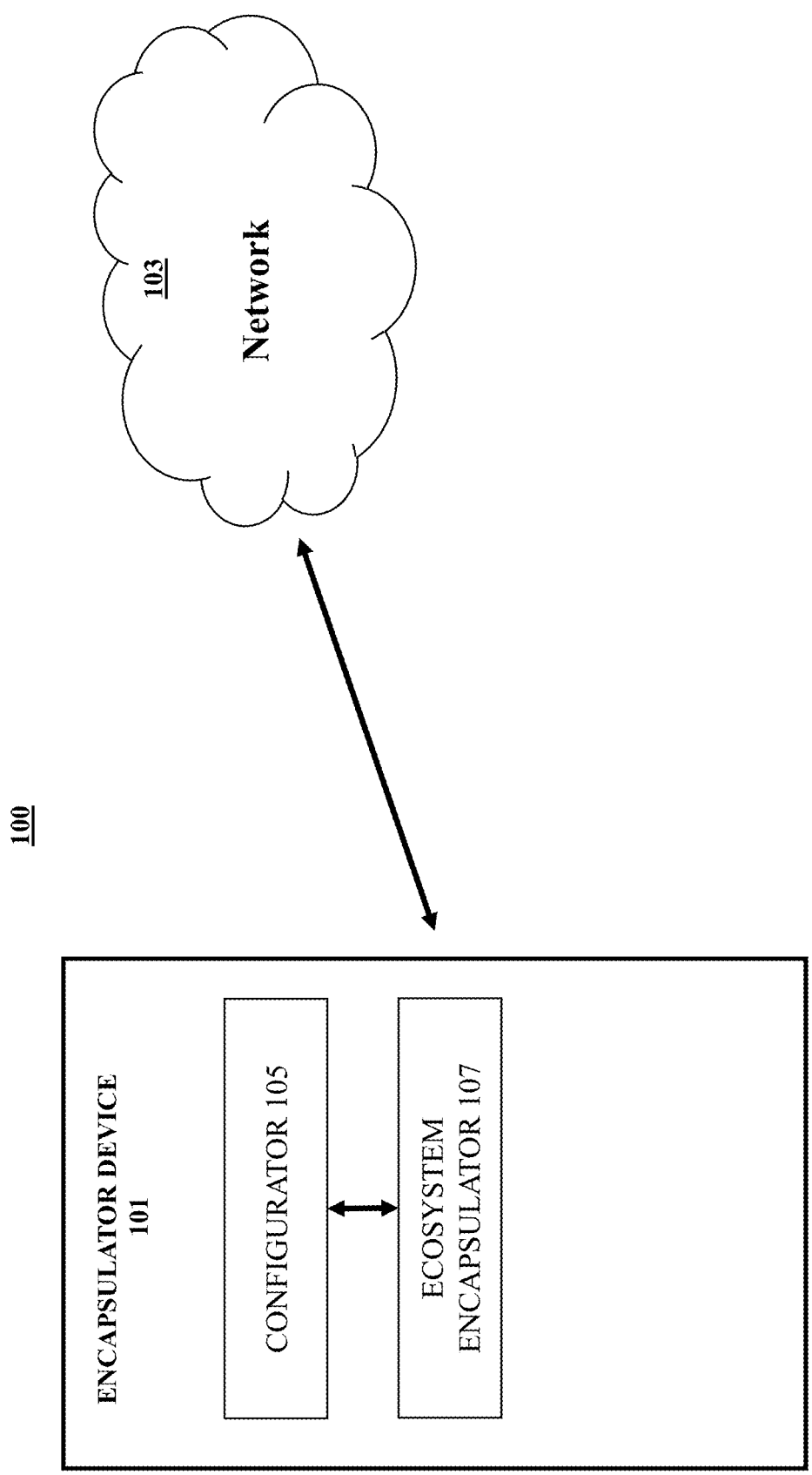
FIG. 1 shows an exemplary networking environment for generating emergency response, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the present invention will be described below in detail with reference to the accompanying drawings.

The present disclosure generally relates to computer-implemented systems and methods, and, more particularly, to ecosystem encapsulator with emergency response and methods that implement blockchain technique and provides optimized utilization of time and resources in scenarios where time is of the essence and increases effectiveness of communication and/or services initiated with minimal human intervention.

According to an embodiment of the present disclosure, an ecosystem encapsulator device is provided with multiple emergency response layers for generating emergency response. FIG. 1 shows an exemplary networking environment for generating emergency response, according to an embodiment of the present disclosure. The networking environment 100 includes an encapsulator device 100 that communicates with a network 103. As an example, but not limited to, the network may be a block chain network, metaverse network and the like. As an example, the encapsulator device 101 may include a smart phone. More examples of the encapsulator device is explained in the forthcoming paragraphs.

According to an embodiment, the encapsulator device 100 includes major two components that enable effective and efficient response in an emergency scenario. The two components correspond to a configurator 105 and ecosystem encapsulator 107.

Now, according to an embodiment, as an example let us consider that the configurator 105 may be made available on the smart phone. The configurator 105 may be the first component according to an embodiment if the present disclosure. The user can configure her emergency ecosystem that is triggered by for example but not limited to gesture, emotion, eye, scream. Each trigger will activate the corresponding ecosystem layers. The ecosystem layer depends on the context of the user. For example, it would comprise of personnel like family, friends, organizations like police, hospital, judiciary, employer, CCTV cameras, IoT devices. The user may also have the ability to transfer pre-configured or real time—messages, video and image files, order cards with specific instructions to the ecosystem player based on the trigger. Thus, one of the emergency response layers that is preconfigured for the emergency event, in response to a detection that the user is in the emergency event. A detail flow of the invention will be explained in the forthcoming paragraphs. Coming back to the functionality of the configurator device 105, once the user has configured this using her smartphone, the second component takes over on trigger, even if her smart phone is destroyed or not functioning. Essentially the second components work directly with the digital twin in the cloud.

According to an embodiment, an ecosystem encapsulator 107 is a second component which encapsulates the ecosystem layers. In a non-limiting example, the ecosystem encapsulator 107 may be embedded in a watch (in the context of a person), in the steering wheel and mirror (in the context of a vehicle) and the like. Each person or organization or electronic device, smart phone is a node on a permissioned private blockchain with IPFS (distributed immutable file system at the backend). This ensures that even if someone tries to destroy the evidence the same is available in a judiciary node. The ecosystem encapsulator device 100 is a battery (multi redundant cells) powered and rugged to withstand shock, heat etc.

Figure 2A:
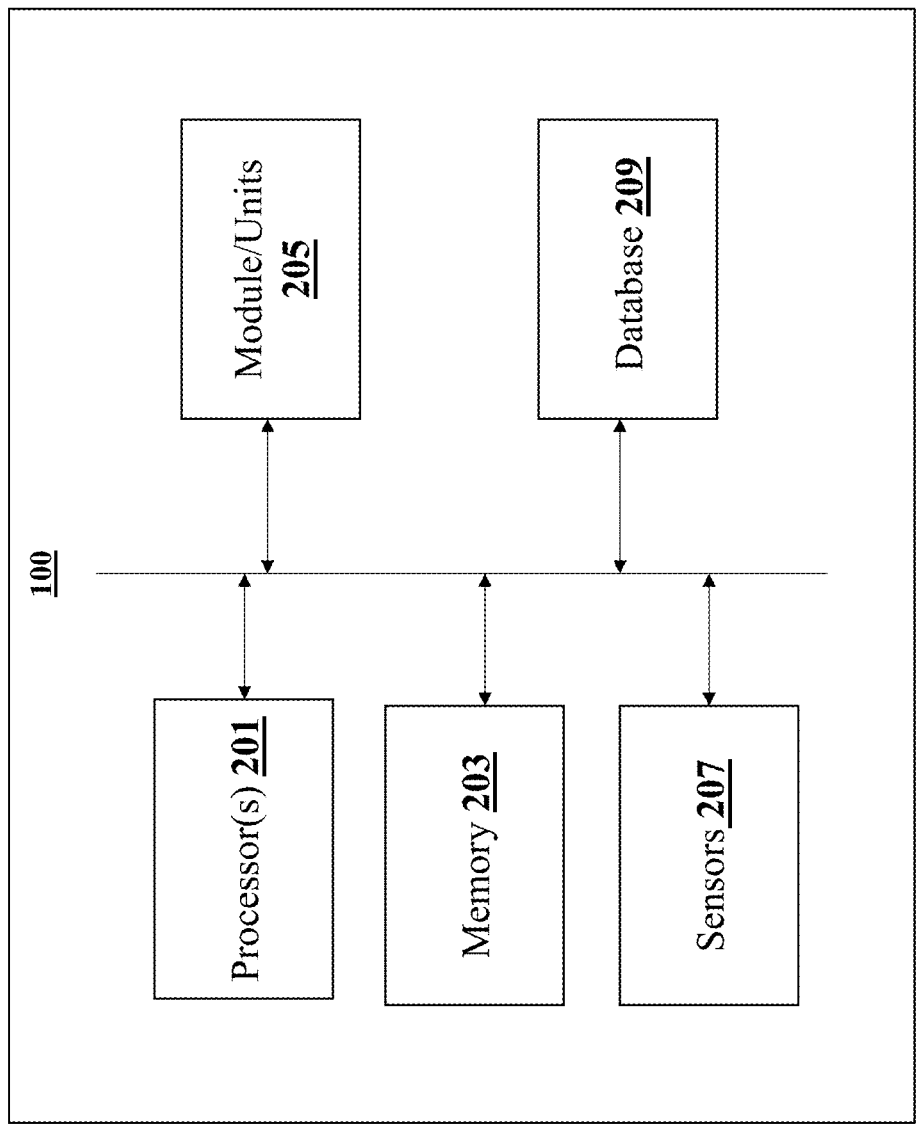
FIG. 2a illustrates a general system architecture for an encapsulator device, in accordance with an embodiment of the present disclosure.

FIG. 2a illustrates a general system architecture for an encapsulator device, in accordance with an embodiment of the present disclosure. As an example, the encapsulator device. The encapsulator device 100 includes a one or more processor(s) 201, coupled with a memory 203, a sensor(s) 207, modules/units 205, and a database 209.

As an example, the encapsulator device 100 may corresponds to various devices such as a personal computer (PC), a tablet PC, a personal digital assistant (PDA), a mobile device, a palmtop computer, a laptop computer, a desktop computer, a communications device, dashboard, navigation device, a computing device, or any other machine capable of executing a set of instructions.

In an example, the processor 201 may be a single processing unit or a number of units, all of which could include multiple computing units. The processor 201 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 201 is configured to fetch and execute computer-readable instructions and data stored in a memory 203.

The memory 203 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module(s), engine(s), and/or unit(s) 205 may include a program, a subroutine, a portion of a program, a software component or a hardware component capable of performing a stated task or function. As used herein, the module(s), engine(s), and/or unit(s) 205 may be implemented on a hardware component such as a server independently of other modules, or a module can exist with other modules on the same server, or within the same program. The module (s), engine(s), and/or unit(s) 205 may be implemented on a hardware component such as processor one or more microprocessors, microcomputers, microcontrollers, digital signal processors, central processing units, state machines, logic circuitries, and/or any devices that manipulate signals based on operational instructions. The module (s), engine(s), and/or unit(s) 205 when executed by the processor(s) may be configured to perform any of the described functionalities.

As a further example, the database 209 may be implemented with integrated hardware and software. The hardware may include a hardware disk controller with programmable search capabilities or a software system running on general-purpose hardware. The examples of database 209 are, but not limited to, in-memory database, cloud database, distributed database, embedded database and the like. The database 209 amongst other things, serves as a repository for storing data processed, received, and generated by one or more of the processors 201, and the modules/engines/units 205.

The modules/engines/units 205 may be implemented with an AI module that may include a plurality of neural network layers. Examples of neural networks include, but are not limited to, convolutional neural network (CNN), deep neural network (DNN), recurrent neural network (RNN), Restricted Boltzmann Machine (RBM). The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning. At least one of a plurality of CNN, DNN, RNN, RMB models and the like may be implemented to thereby achieve execution of the present subject matter's mechanism through an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. As an example, the sensors 207 may include motion sensors, image sensors, sound sensors, proximity sensors, and the like.

Figure 2B:
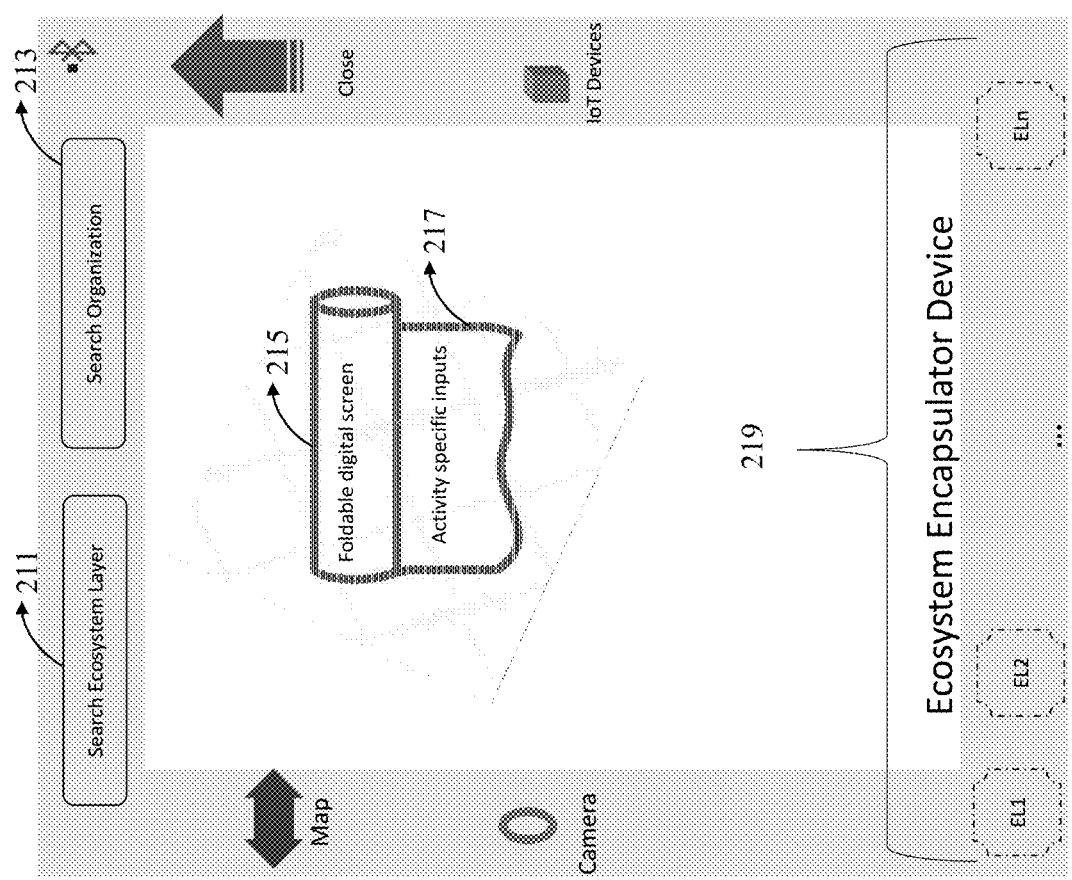
FIG. 2b illustrates an example ecosystem encapsulator device, according to an embodiment of the present disclosure.

FIG. 2b illustrates an example ecosystem encapsulator device, according to an embodiment of the present disclosure. According to an embodiment, the ecosystem encapsulator device 101 may installed on a user device. As an example, the encapsulator device 101 may be a device in which the ecosystem encapsulator 107 is either implemented, installed, or sticked for example may be embedded in a watch (in the context of a person), in the steering wheel and mirror (in the context of a vehicle) and the like. As shown in the FIG. 2b, a foldable digital screen 215 may be used to provide and inputs by the user to configure one or more emergency response layer 219 so that each of the more emergency response layer EL1, EL2 . . . EL3 gets trigger based on the user configuration. In a non-limiting example, consider a scenario where the user wants to configure the emergency response layer in an occurrence of any emergency event. For example, in an occurrence of a car accident, layer one EL1 is configured to activate nearby vehicles for emergency help. Further, the user may configure layer one EL2 to activate after the trigger of EL1 as a second layer of emergency help. The user may configure to activate authorized entities like friends, relatives, nearby police station, ambulance, hospital, emergency control room and the like. Accordingly, each of the plurality of emergency response layers is configured to trigger a next emergency response layer based on the configuration done by the user.

Figure 3:
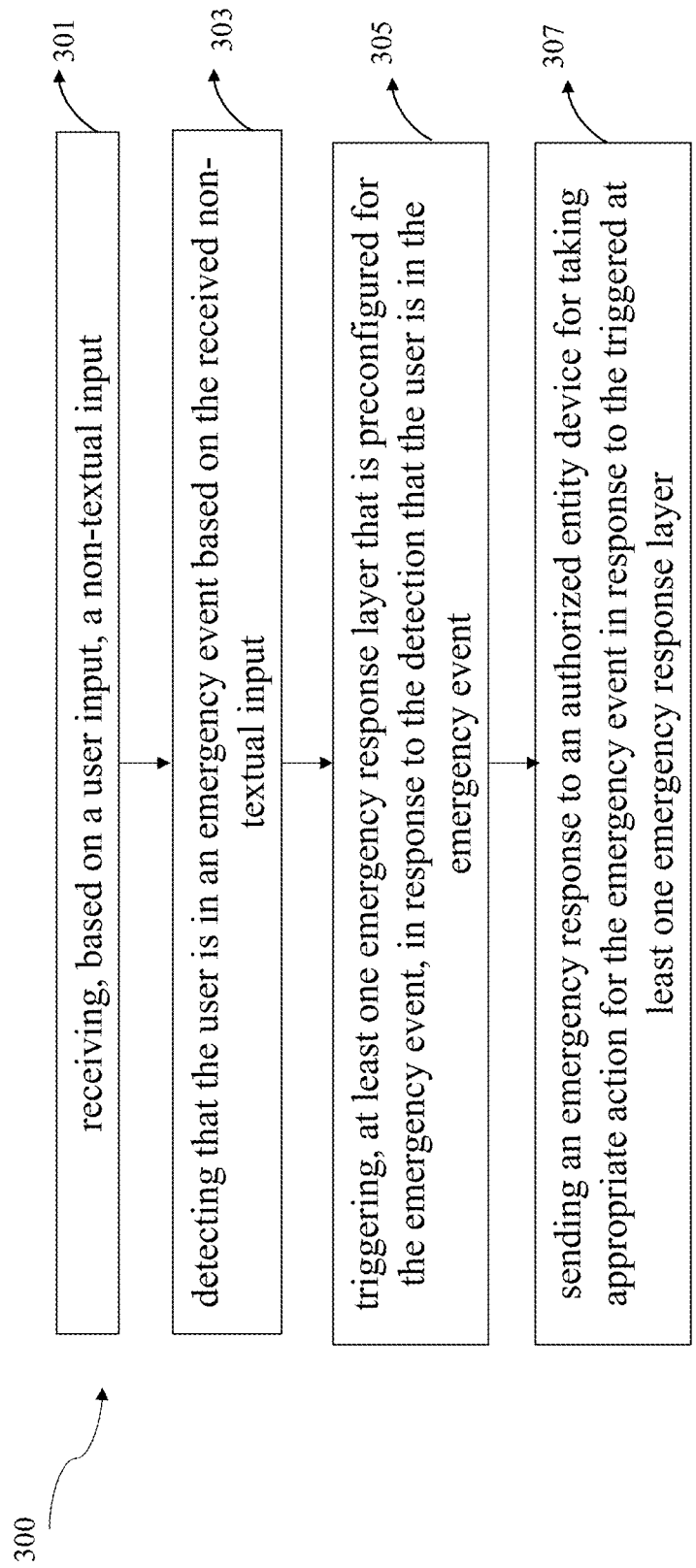
FIG. 3 illustrates a flow chart for generating an emergency response, according to an embodiment of the present disclosure.

FIG. 3 illustrates a flow chart for generating an emergency response, according to an embodiment of the present disclosure. The method 300 is implemented in system 100. Further, each of the method steps is performed by the processor(s) 201.

Figure 4:
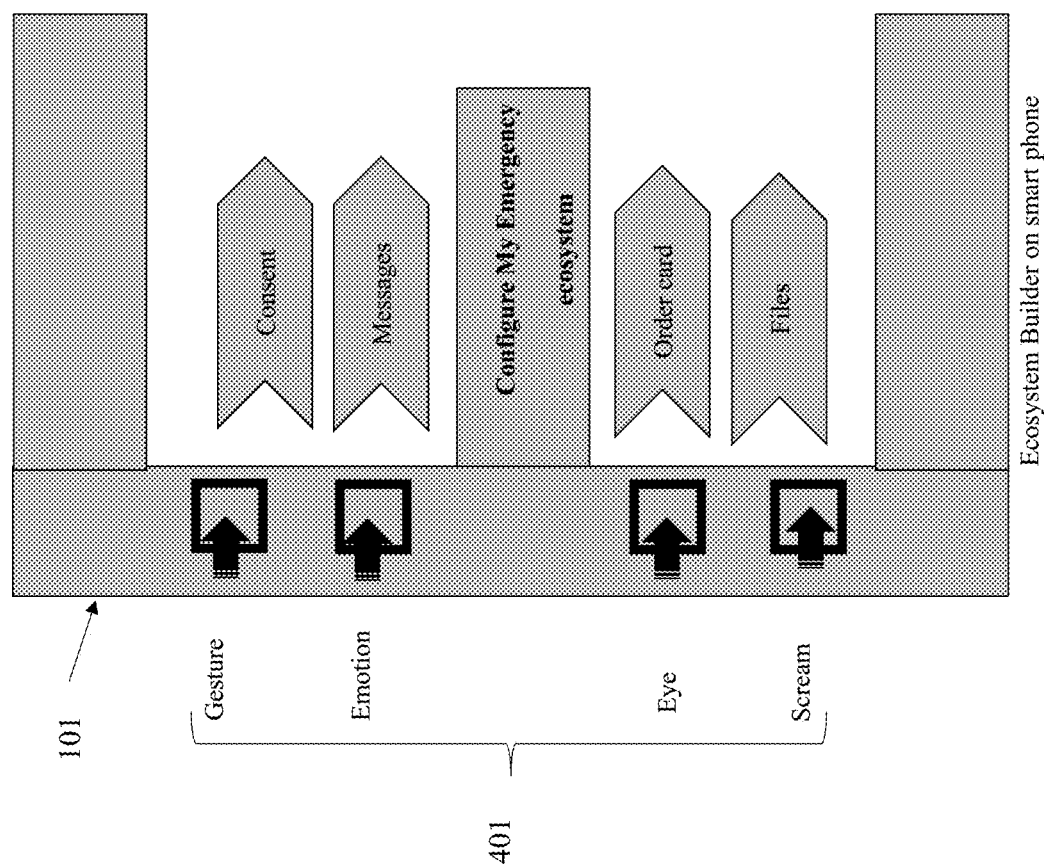
FIG. 4 illustrates an example ecosystem builder on smart phone, according to an embodiment of the present disclosure.

At steps 301, the processor 201 may be configured to receive a non-textual input. As an example, the non-textual input may include, but not limited to, a gesture, voice, and emotion of the user. FIG. 4 illustrates an example ecosystem builder on smart phone, according to an embodiment of the present disclosure. As an example, FIG. 4 shows the non-textual input 40 that may include gesture of the user, emotion of the user, eye image of the user, scream of the user. The encapsulator device 100 may continuously monitors to receive the non-textual input from the user.

Thus, at step 303 the processor 201 may be configured to detect that the user is in an emergency event based on the received non-textual input. As an example, if the encapsulator device 101 receive a scream or any such gesture, based on this the encapsulator device 101 determines that an emergency event has occurred.

After detection of the emergency event, at step 305 the processor 201 may be configured to trigger, at least one emergency response layer 219 that is preconfigured for the emergency event, in response to the detection that the user is in the emergency event. As an example, as shown in the FIG. 4 the user has configured the emergency ecosystem that may be triggered by, for example but not limited to, gesture, emotion, eye, scream. Now after the detection of the emergency event, a trigger will activate the corresponding ecosystem layer 219. Thus, the triggers from Layer 0 will be part of the consensus algorithm when it comes to transactions between Layer 0 and any other ecosystem layer. This ensures the transactions initiated from Layer first get priority over all other transactions. When particular personnel, organization, device in an ecosystem layer is activated, the underlying blockchain will issue a certificate to that entity essentially authorizing the entity to do the transactions on the user's behalf. The user will also have the ability to transfer pre-configured or real time—messages, video and image files, order cards with specific instructions to the ecosystem player based on the trigger. Each of this will be captured as a transaction on the blockchain.

Figure 5:
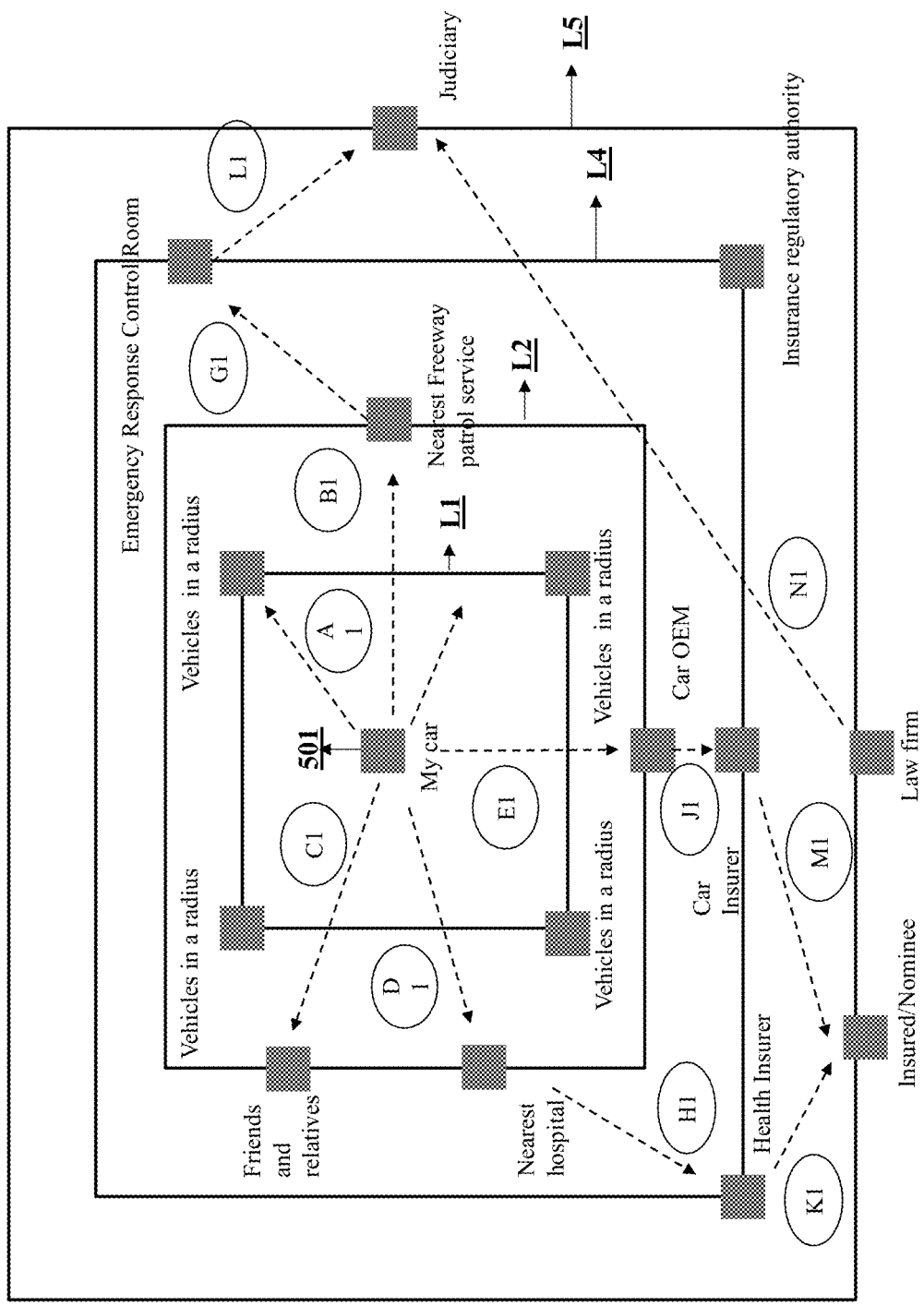
FIG. 5 illustrates an example scenario related to occurrence of an emergency response and triggering of an emergency response layer, according to an embodiment of the present disclosure.

At step 307, the processor 201 may be configured to sending an emergency response to an authorized entity device for taking appropriate action for the emergency event in response to the triggered at least one emergency response layer. Continuing with the same embodiment, multiple events may be triggered and executed in co-ordination during emergency scenarios in particular, for expected outcomes. FIG. 5 illustrates an example scenario related to occurrence of an emergency response and triggering of an emergency response layer. According to the current exemplary embodiment, the user is able to respond to an emergency scenario with just a few pre-configured triggers and is assured of the fact that there is a deterrent to tampering of evidence, ecosystem not responding as expected and that the service levels are met. For example, but not limited to, consider the case where an autonomous car at high speed malfunctions and poses a life threatening danger to the passenger. A few entities will need to be in play in such a situation. This will include for example, car, hospital, family, friend, the car manufacturer, the car insurer, the health insurer, the police and the judiciary. Each of the entities have a role to play in the context of the services they can provide during and after the event based on specific triggers.

Figure 6:
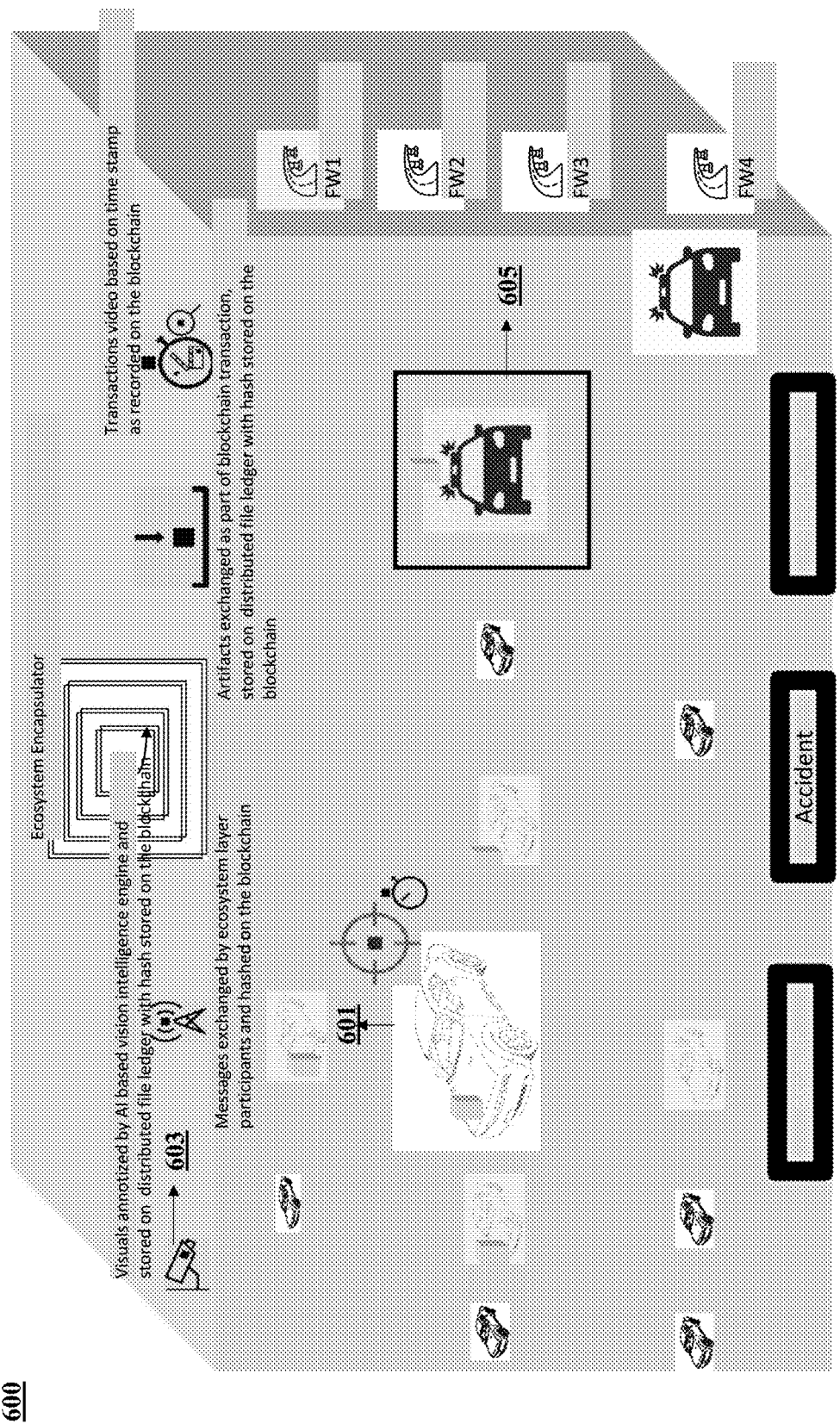
FIG. 6 illustrates an encapsulated ecosystem in a metaverse network, according to an embodiment of the present disclosure.

According to an example the user who uses an autonomous car 501 as shown in the FIG. 5. The user has configured the ecosystem layers with the associated trigger as explained above. For a case where the car 501 is malfunctioning the car 501 could trigger an alert to all cars within a particular radius so that they can appropriate course of action. In this case all cars within a particular radius constitute the first ecosystem layer L1. The assumption here is all cars have connected car feature and each of them have subscribed to the blockchain network. The trigger in this case could be emotion/gesture. This may be detected by an intelligent CCTV (that has artificial intelligence powered Vision intelligence) inside the car. FIG. 6 shows an example of ecosystem encapsulation in the above context.

The alert to the cars in a particular radius and their response may be captured as a transaction. Thus, the ecosystem encapsulator device 101 generates a transaction with a corresponding hash for each of the triggered at least one emergency response layer. Now each of the emergency response layer includes an information of one or more participants that are involved in the transaction. Accordingly, only the nodes in this ecosystem layer participates in this transaction while the transactions can still be viewed by the nodes in the subsequent ecosystem layers as well. This ensures optimization of computing power as against all the nodes in an ecosystem layer participating in a transaction. Thus, according to an embodiment, the ecosystem encapsulator device 101 sends the generated transaction with the corresponding hash for each of the triggered emergency response layer to the network 103. Further, the generated transaction with the corresponding hash is stored in a distributed file ledger of the network 103.

The cars 101 in the ecosystem layer 2 L2 can take an image of the car 101 and may share with Freeway patrol service as preconfigured by the user to trigger this response. The same transaction may be done by the passenger in the car 101 if the user is in a condition to do so or this could be an auto trigger based on a gesture or eye movement or scream.

As an example, the second ecosystem layer L2 may be preconfigured to include the freeway service patrol, friends and relatives, nearby hospitals and the Car OEM. The trigger may be a scream as an example and there will be transactions between and the car 101 and the entities in the Ecosystem Layer L2 as shown in Table 1. Based on the service levels defined (exception being friends and relatives) there will be key performance indicators that is be measured in every transaction. For example, if the service levels of hospital to emergencies is not meeting target KPI levels, then the hospital node will be excluded from the consensus mechanism in the blockchain in future transactions. This helps save the compute power as there is one less node. The aforesaid is detected based on the transaction and the corresponding hash associated with the transaction. Further, there can be a tampering of the data during an emergency event, that may also be detected based on the transaction and the corresponding hash associated with the transaction.

As an example, the third ecosystem layer L3 may include of the entities in the insurance domain—Insurance Regulatory authority, the car insurer and the health insurer, and the Emergency Response Control Room. Examples of transactions are outlined in Table 1.

As a further example, the fourth ecosystem layer L4 may include an insure/nominee, a law firms and a judiciary. Examples of transactions are outlined in Table 1.

Now according to an embodiment, the network 103 may issue a certificate to the authorized entity device to perform the transaction on behalf of the user in response to the triggered at least one emergency response layer that is preconfigured for the emergency event. As an example, the ecosystem second layer L2 may trigger a L4 to make a call to the emergency response control room on behalf of user as the user has preconfigured this trigger, thus during the transaction between the layers the network issues a certificate to the authorized entity, now in case the device is tampered or some other entity which is not authorized try to make a transaction then such transaction will be noted by the encapsulator device 101. Accordingly, the present methodology also provides a secure way of communication.

TABLE 1

| | What is hashed | Trigger | Ecosystem Layer From | Ecosystem Layer To | Ecosystem Entity From | Ecosystem Entity To |
|---|---|---|---|---|---|---|
| A1 | Alert | Emotion/Gesture | Layer 1 | Layer 2 | My car | Vehicles in a radius |
| B1 | Vehicle number, car dashboard snapshot | Emotion/Gesture | Layer 1 | Layer 3 | My car | Freeway patrol service |
| C1 | Car KPIs | Emotion Gesture | Layer 1 | Layer 3 | My car | Car OEM |
| D1 | Personal Health Record | Emotion/Gesture | Layer 1 | Layer 3 | My car | Nearest hospital |
| E1 | Emergency message | Emotion Gesture | Layer 1 | Layer 3 | My car | Friend and relatives |
| F1 | Vehicle condition snapshot | Image upload | Layer 2 | Layer 3 | Vehicles in a radius | Freeway patrol service |
| G1 | Personal Health Record updated | Online submission | Layer 3 | Layer 4 | Nearest hospital | Health insurer |
| H1 | Claim Form | Online submission | Layer 3 | Layer 4 | Car OEM | Car Insurer |
| I1 | Accident Report | Online submission | Layer 3 | Layer 5 | Freeway patrol service | Judiciary |
| J1 | Claim amount approve, Co-pay-Health | Online submission | Layer 4 | Layer 5 | Health insurer | Nominee |
| L1 | Claim amount approve, Co-pay-Car | Online submission | Layer 4 | Layer 5 | Car Insurer | Nominee |
| K1 | Evidence Package | Online issual | Layer 5 | Layer 6 | Judiciary | Law firm |

FIG. 6 illustrates an encapsulated ecosystem in a metaverse network, according to an embodiment of the present disclosure. FIG. 6 shows a metaverse network 600 where on a graphical user interface (GUI), information of each of the participants in the plurality of emergency response layers maybe rendered as a metaverse icon in a metaverse network.

According to an embodiment, when each of the icons where clicked, each of the transaction that has occurred with that node is displayed. For example, if the icon 601 is clicked then all the transactions for example, transactions occurred with the entities of the layer 1, layer 2, layer 3 may be displayed. This helps to find out the authenticated transactions between the layers. Now during the access each of the metaverse icon gets highlighted. According to an embodiment, the information of each of the participants in the plurality of emergency response layer is received from at least one of an images capturing device or the user device. As an example, the received information corresponds to at least one of a videos, the generated transaction. Further, the received information is displayed as an annotated video in the metaverse network. Thus, a pattern or anomalies in the annotated video may be identified during each access by the authorized entity. This can be explained how the encapsulated ecosystem unfolds in an Emergency Response control room with the help of FIGS. 5 and 6.

Let us take the case of the passenger in the autonomous car. Based on Emotion/gesture the nearest Freeway Patrol service in Ecosystem Layer 2 is alerted who in turn sends the alert to the Emergency Response Control room in Ecosystem Layer 3.

The Emergency Response Control room personnel will now see the ecosystem layers as configured by the passenger in the car. The freeway that the car is in, all of the cars in Ecosystem Layer 1 and have responded to the alert, the nearest freeway patrol service that send the alert to the Emergency Response Control room (not shown in the FIG. 6) will be highlighted on the metaverse network 600. Each of them will have a grey square as a highlighter 605 as that signifies that they are participating in blockchain transactions in this specific emergency scenario. The metaverse network 600 on blockchain can be accessed by authorized personnel who are in the access control list, a hash of which is stored in the blockchain.

The visuals from the CCTV footage will be analyzed and annotated by AI based vision intelligence engine and stored on distributed file ledger, with the corresponding hash stored on the blockchain. The authorized personnel can go into the metaverse network 600 of the car, put the spotlight on the car 601. Further, user may use the 3D view finder to select the view, select the time stamp to play the annotated video and analyze.

Also, the Messages exchanged by ecosystem layer participants are hashed and the hash is stored on the blockchain. This can also be viewed by the authorized personnel. By default, the messages between Layer 0 and Layer 1 will be shown. The user can select the ecosystem layers in the encapsulator on the metaverse to view messages between participants in any 2 ecosystem layers. The artifacts listed in Table 1 exchanged as part of blockchain transaction, stored on the distributed file ledger with hash stored on the blockchain. This can also be viewed by the authorized personnel. The user for example a judge can play out all of the blockchain transactions based on the time stamp. In this case the metaverse will auto navigate from one ecosystem layer to another based on the order of transactions as in the blockchain. The technical advantages of the present methodology will be explained below.

Typically, the extent of options the end customer has in triggering a blockchain transaction is limited especially if time is of the essence which is the case in the case of a medical emergency for example. The present methodology hands out options to the end customer as explained above. Secondly the end customer has very little control on how the blockchain transactions are ordered. especially if time is of the essence which is the case in the case of a medical emergency for example. The present methodology handout options to the end customer as explained above. Essentially the end customer is able to set a priority to the communication to the various entities. Further, the GUI is based on how human beings interact with each other, with organizations and devices vs workflow based which is foreign especially to a layman. It also uses combinations of non-verbal communications to communicate. Both of this increases the efficiency and effectiveness of the communication. Further, the present methodology provides a secure transaction in case of an emergency event and its response so that any forge person should not take undue advantage of the user.

Some example embodiments disclosed herein may be implemented using processing circuitry. For example, some example embodiments disclosed herein may be implemented using at least one software program running on at least one hardware device and performing network management functions to control the elements.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

I claim:

1. A method, implemented on an ecosystem encapsulator device configured with a plurality of emergency response layers for generating an emergency response, wherein the ecosystem encapsulator device communicates with a private blockchain network, the method comprising:

receiving, based on a user input, a non-textual input;

detecting that the user is in an emergency event based on the received non-textual input;

triggering, at least one emergency response layer that is preconfigured for the emergency event, in response to the detection that the user is in the emergency event;

sending an emergency response to an authorized entity device for taking appropriate action for the emergency event in response to the triggered at least one emergency response layer;

generating a transaction with a corresponding hash for each of the triggered at least one emergency response layer, wherein each of the at least one emergency response layer includes information of one or more participants that are involved in the transaction;

sending the generated transaction with the corresponding hash for each of the triggered at least one emergency response layer to the private blockchain network;

rendering, on a graphical user interface (GUI), information of each of the one or more participants in the plurality of emergency response layers as a metaverse icon in a metaverse network; and displaying each of the generated transaction corresponding to each of the one or more participants when accessed the metaverse icon via a user input, wherein each of the metaverse icon is highlighted during each access.

2. The method of claim 1, wherein the private blockchain network issues a certificate to the authorized entity device to perform the transaction on behalf of the user, wherein the private blockchain network issues the certificate in response to the triggered at least one emergency response layer that is preconfigured for the emergency event.

3. The method of claim 1, wherein the generated transaction with the corresponding hash is stored in a distributed file ledger of the private blockchain network, and wherein at least one of a tampering of data in a user device, meeting of key performance indicator's (KPI's) that is defined for the authorized entity device are detected based on the transaction and the corresponding hash associated with the transaction.

4. The method of claim 1, further comprising:

configuring, based on the user input, the plurality of emergency response layers according to a preference of the user, wherein each of the plurality of emergency response layers is configured to trigger a next emergency response layer based on the configuration.

5. The method of claim 1, wherein the non-textual input comprises at least one of a gesture, voice, and emotion of the user, wherein the emergency response comprises a real time or a pre-configured at least one of messages, video, and image files, and order cards with specific instructions, and wherein the authorized entity device is associated with at least one of the user's family member, friends, and the authorized entity.

6. The method of claim 1, wherein the ecosystem encapsulator device is installed on a user device, and wherein the user device functions as a node for the private blockchain network.

7. The method of claim 1, further comprising:

receiving the information of each of the one or more participants in the plurality of emergency response layer from at least one of an image capturing device or a user device, wherein the received information corresponds to at least one of a video and the generated transaction; and displaying the received information as an annotated video in the metaverse network, wherein a pattern or anomalies in the annotated video is identified during each access.

8. An ecosystem encapsulator device configured with a plurality of emergency response layers for generating an emergency response, wherein the ecosystem encapsulator device communicates with a private blockchain network, the ecosystem encapsulator device comprising at least one processor coupled with a memory, wherein the at least one processor is configured to:

receive, based on a user input, a non-textual input;

detect that the user is in an emergency event based on the received non-textual input;

trigger, at least one emergency response layer that is preconfigured for the emergency event, in response to the detection that the user is in the emergency event;

send an emergency response to an authorized entity device for taking appropriate action for the emergency event in response to the triggered at least one emergency response layer;

generate a transaction with a corresponding hash for each of the triggered at least one emergency response layer, wherein each of the at least one emergency response layer includes an information of one or more participants that are involved in the transaction;

send the generated transaction with the corresponding hash for each of the triggered at least one emergency response layer to the private blockchain network;

render, on a graphical user interface (GUI), information of each of the one or more participants in the plurality of emergency response layers as a metaverse icon in a metaverse network; and display each of the generated transaction corresponding to each of the one or more participants when accessed the metaverse icon via a user input, wherein each of the metaverse icon is highlighted during each access.

9. The ecosystem encapsulator device of claim 8, wherein the private blockchain network issues a certificate to the authorized entity device to perform the transaction on behalf of the user, wherein the private blockchain network issues the certificate in response to the triggered at least one emergency response layer that is preconfigured for the emergency event.

10. The ecosystem encapsulator device of claim 8, wherein the generated transaction with the corresponding hash is stored in a distributed file ledger of the private blockchain network, and wherein at least one of a tampering of data in a user device, meeting of key performance indicator's (KPI's) that is defined for the authorized entity device are detected based on the transaction and the corresponding hash associated with the transaction.

11. The ecosystem encapsulator device of claim 8, wherein the at least one processor is further configured to:

configure, based on the user input, the plurality of emergency response layers according to a preference of the user, wherein each of the plurality of emergency response layers is configured to trigger a next emergency response layer based on the configuration.

12. The ecosystem encapsulator device of claim 8, wherein the non-textual input comprises at least one of a gesture, voice, and emotion of the user, wherein the emergency response comprises a real time or a pre-configured at least one of messages, video, and image files, and order cards with specific instructions, and wherein the authorized entity device is associated with at least one of the user's family member, friends, and the authorized entity.

13. The ecosystem encapsulator device of claim 8, wherein the ecosystem encapsulator device is installed on a user device, and wherein the user device functions as a node for the private blockchain network.

\* \* \* \* \*